United States Patent

Negishi et al.

[11] Patent Number: 5,929,945
[45] Date of Patent: *Jul. 27, 1999

[54] MODULAR REAR PROJECTION TELEVISION HAVING AN AIRTIGHT UPPER CABINET

[75] Inventors: Noriaki Negishi, Tokyo; Hiroshi Horiuchi, Kanagawa; Katsuhiro Yamashita, Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,539

[22] Filed: Sep. 30, 1996

[30] Foreign Application Priority Data

Sep. 29, 1995 [JP] Japan ............... PO 7-252994

[51] Int. Cl.$^6$ ............................................... H05K 7/20
[52] U.S. Cl. ........................................ 348/825; 348/836
[58] Field of Search ........................... 348/825, 836, 348/838–839, 842

[56] References Cited

U.S. PATENT DOCUMENTS 4,491,872  1/1985  Boldt et al. .................... 358/237
5,514,036  5/1996  Lin ................................. 454/184

OTHER PUBLICATIONS

Ryuji, et al., Japanese Patent Abstracts, Publ. No. JP5153533 Project Type Display Device, vol. 17, No. 545, Jun. 1993.

*Primary Examiner*—Thomas D. Lee
*Assistant Examiner*—Stephen Brinich
*Attorney, Agent, or Firm*—Jay H. Maioli

[57] ABSTRACT

One kind of housing has been formed for rear projection televisions of each screen size in inches and it has not been possible to change the size in inches for such a housing. This has reduced productivity and results in a cost increase. An upper cabinet and a lower cabinet of a rear projection television are formed separately. A screen and a mirror are provided on the upper cabinet. A main component portion for a television comprising video devices, driving and control circuits, an optical unit including a projection lens, and a light source is provided on the lower cabinet. Upper cabinets of different screen sizes in inches are assembled with a common lower cabinet to allow rear projection televisions of various sizes in inches to be easily manufactured.

8 Claims, 6 Drawing Sheets

MODULAR REAR PROJECTION TELEVISION HAVING AN AIRTIGHT UPPER CABINET

FIELD OF THE INVENTION

The present invention relates to a rear projection television incorporating a video device such as a liquid crystal display (hereinafter referred to as LCD), an optical unit including a projection lens, a light source, a mirror and the like and having a screen mounted on a front side of an upper part thereof.

BACKGROUND OF THE INVENTION

This type of rear projection television is easier to make larger compared to televisions utilizing a Braun tube because its screen can be formed wide with a reduced depth. A rear projection television 1 shown in FIG. 1 has a configuration wherein wood plate materials are used; the plate materials are formed into a box which constitutes a main body portion 2; a screen mounting portion 4 having a screen 3 mounted thereon is mounted on a front side of the main body portion; a mirror mounting portion 6 having a mirror 5 is mounted on a rear side; and a bottom cabinet 7 having video devices and electronic components and the like for projecting images are integrally provided on the lower part of the main body portion 2.

A rear projection television 1 shown in FIG. 2 has a configuration wherein a metal frame 8 in a predetermined shape is placed to erect on a bottom cabinet 7; and a screen mounting portion 4 having a screen 3 and a mirror mounting portion 6 having a mirror 5 are integrally mounted so that they envelope the frame 8 from before and behind it.

In the first example, the screen mounting portion 4 and the mirror mounting portion 6 are mounted on the main body portion 2 which is made of wood in front of and behind it, respectively. The size of the main body portion 2 and the overall size of the television including the mirror mounting portion 6 are determined by the size of a screen, and each part of the housing is formed with a size and dimensional accuracy originally designed to provide a single housing that depends on the size of the television screen, i.e., the size thereof in inches. As a result, such parts are not compatible with other sizes in inches. This results in a problem not only in that production efficiency is low but also in that a need for maintaining predetermined strength of the main body portion 2 of the wood cabinet inevitably increases the thickness of the plates and the overall weight.

In the second example, although the metal frame 8 is used, it is designed as a housing of one size in accordance with the size of a television screen. As a result, there is no compatibility with other sizes in inches at all. At the same time, the use of the metal frame 8 results in a problem not only in that the overall weight is increased but also in that the associated increase in the number of parts makes parts management operations complicated and reduces the efficiency of assembly operations.

Further, in either of the examples, since the housing is formed as a single element, the screen and mirror are mounted in the same space in the housing where other constituent members are provided. This puts them into contact with the air flowing through the interior of the housing. As a result, the screen and mirror get dirty because of dust and the like sticking thereto, which leads to a problem in that the display of images is degraded.

Thus, housings are manufactured to meet each size in inches of television screens, problems to be solved exist in order to simplify the configuration as a whole, to improve compatibility between various sizes in inches, i.e., to achieve ease of manufacture with optical accuracy maintained, and to prevent images from being degraded by dirty optical components.

SUMMARY OF THE INVENTION

One object of the present invention is to provide a rear projection television having a lower cabinet used commonly regardless a size of a television screen.

According to the present invention, a rear projection television has an upper cabinet and a lower cabinet separately formed. The upper cabinet has a screen and a mirror therein. The lower cabinet has video devices, driving and control circuits, an optical unit including a projection lens, and a light source therein. A focus of the projection lens is adjusted according to a selected size of the upper cabinet and the upper cabinet is detachably attached to the lower cabinet.

In addition to the above-described configuration, the upper cabinet is formed like a box which is enclosed at all sides thereof with an opening provided on the bottom thereof to which faces the projection lens; the lower cabinet is provided with an air inlet at the front side thereof to cool the interior thereof by the outside air taken in from the air inlet and an air flow path to discharge the air at the rear side thereof; a filter is detachably disposed on the air inlet; a light source mounting portion is provided on the front side of the lower cabinet; and a light source is detachably mounted on the light source mounting portion.

The rear projection television is formed so that it can be separated into the upper and lower cabinets. The main component portion for the television is provided in the lower cabinet, and the screen and mirror is provided in the upper cabinet. This allows the lower cabinet to be commonly used irrespective of the sizes in inches of television screens. The upper cabinet is formed in any size in inches of a television screen and may be applied to sizes in inches of various television screens by changing the focus of the projection lens. Therefore, the selection of appropriate upper cabinets allows rear projection televisions of various sizes in inches to be easily manufactured.

DETAILED DESCRIPTION OF THE PREFERRED EMBODIMENTS

Figure 1:
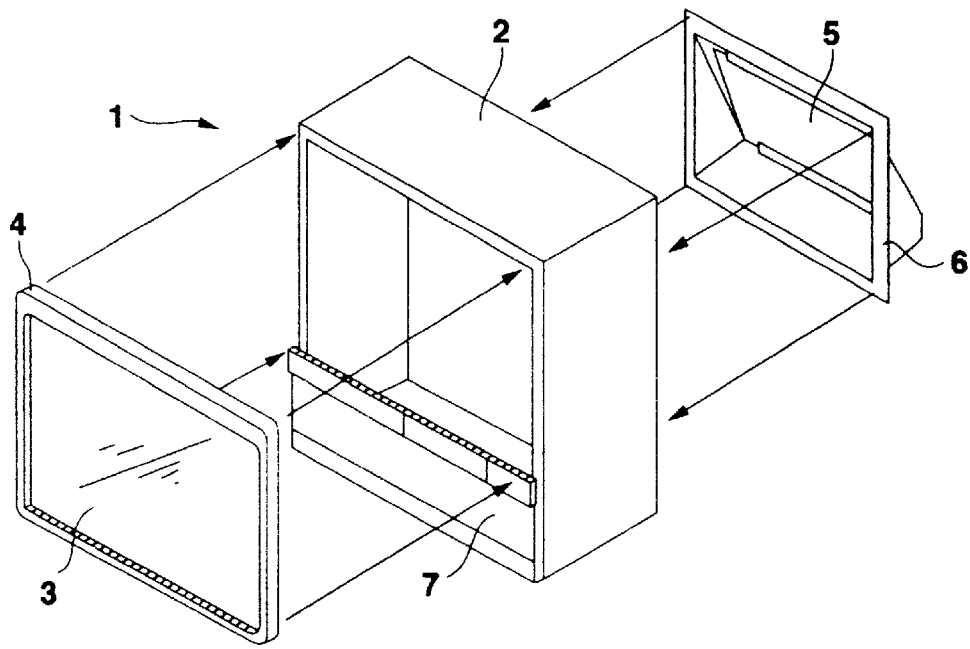
FIG. 1 is an exploded perspective view of an example of a rear projection television.
Figure 2:
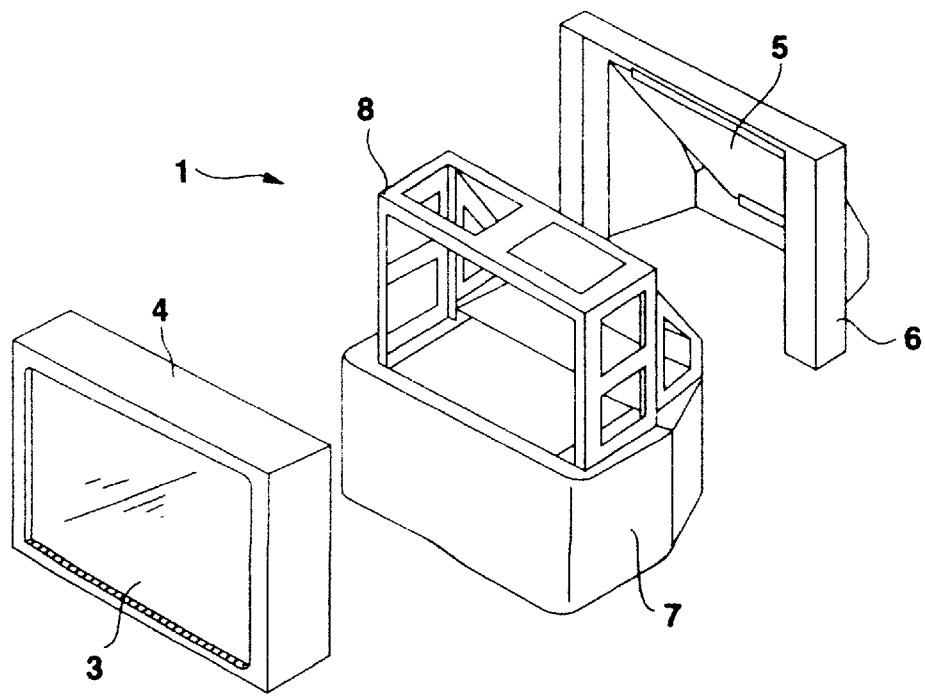
FIG. 2 is an exploded perspective view of another example of a rear projection television.
Figure 3:
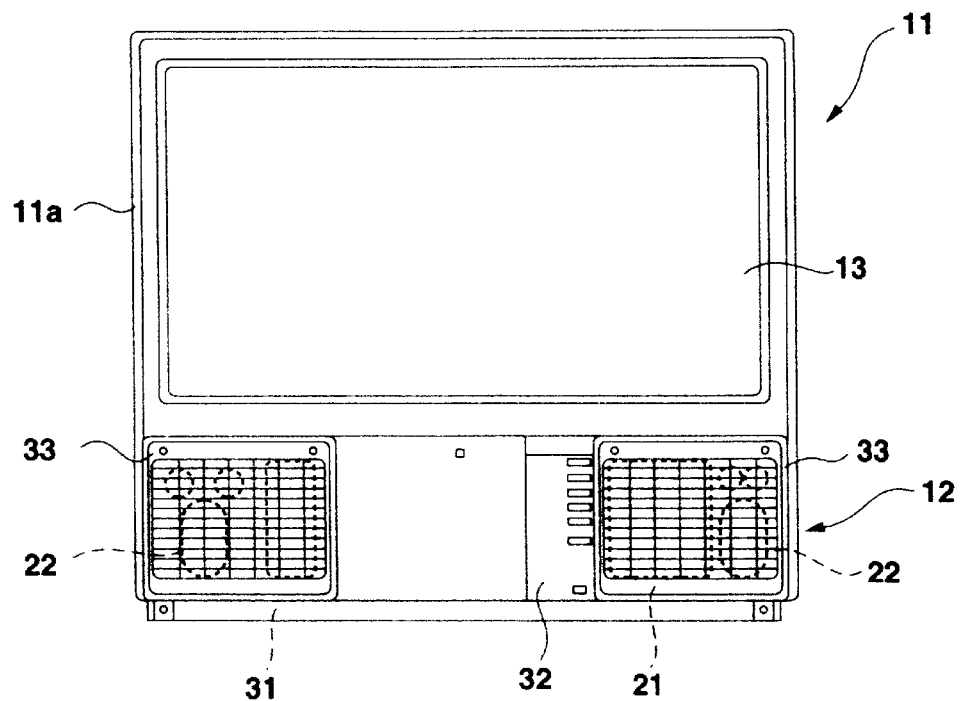
FIG. 3 is a front view of a rear projection television according to a first embodiment of the present invention.
Figure 4:
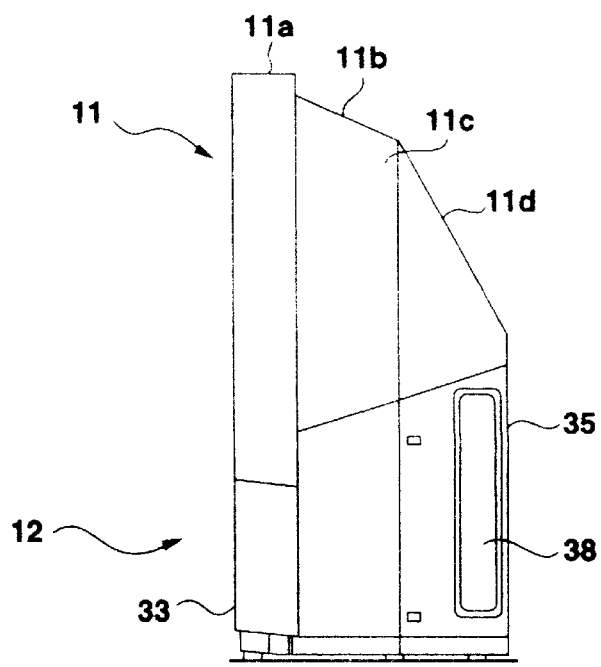
FIG. 4 is a side view of the rear projection television according to the first embodiment.
Figure 5:
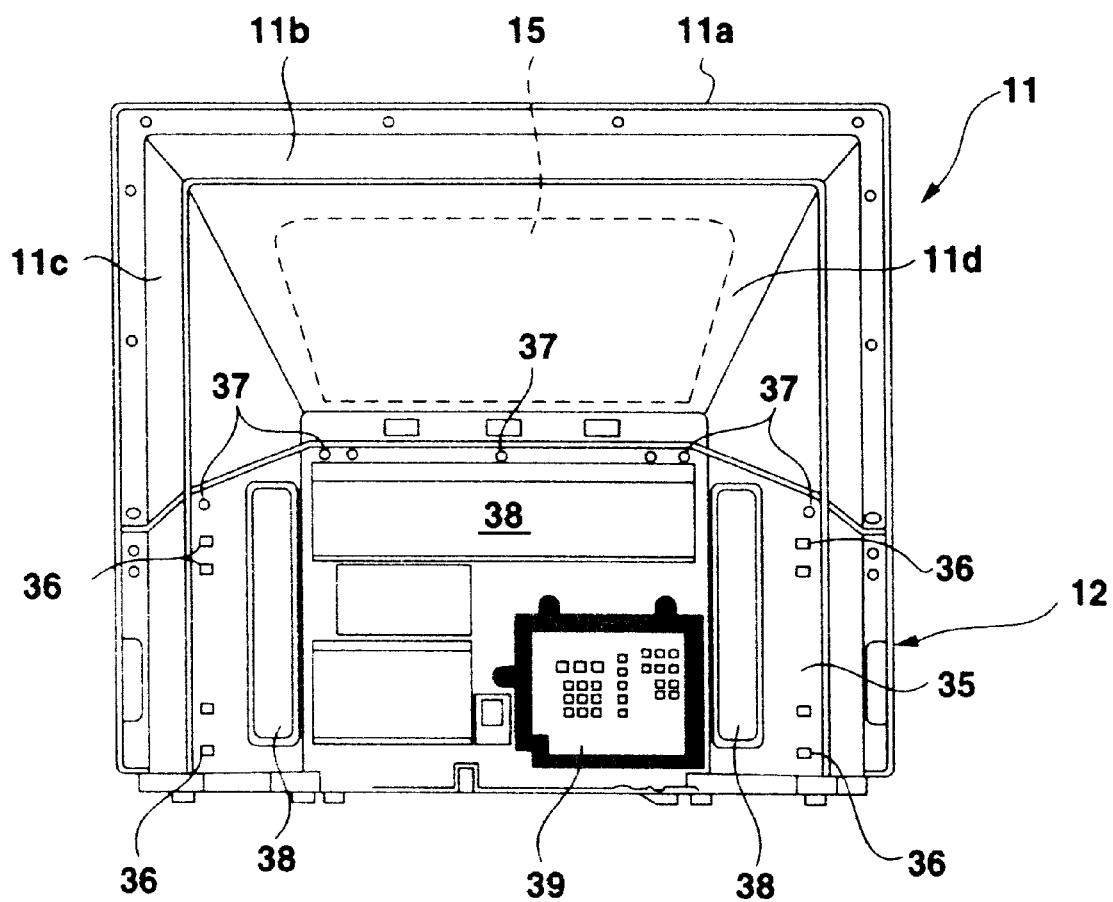
FIG. 5 is a rear view of the rear projection television according to the first embodiment.
Figure 6:
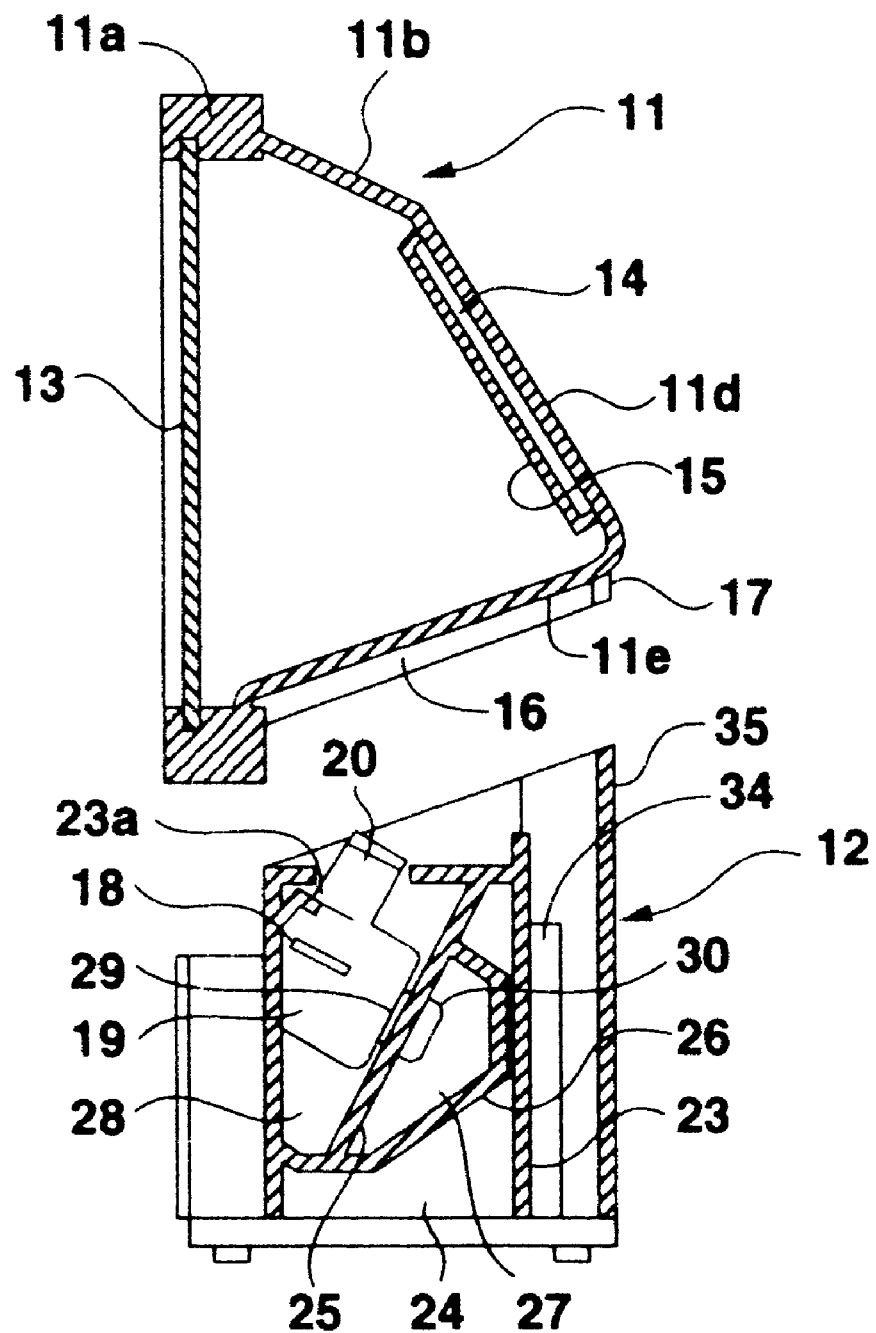
FIG. 6 is a simplified sectional view of the rear projection television according to the first embodiment with an upper cabinet and a lower cabinet shown in a separated state.

The present invention will now be described in detail with reference to the illustrated embodiments thereof. The present invention is applied to any kinds of rear projections. But here, a liquid crystal rear projection is described in detail as an example. The liquid crystal rear projection television of the first embodiment shown in FIGS. 3 through 6 is formed by an upper cabinet 11 and a lower cabinet 12 so that it can be separated in the middle thereof. The upper cabinet 11 and the lower cabinet 12 are formed independently of each other and are configured so that the upper cabinet 11 is assembled onto the lower cabinet 12.

The upper cabinet 11 is formed with a rectangular frame portion 11a on a front side thereof, and a screen 13 is mounted on the frame portion. The upper cabinet is formed by a top wall 11b, two side walls 11c, a rear wall 11d, and a bottom wall 11e in the form of an empty and sealed box as a whole and has a mirror 15 mounted inside the rear wall 11d with a base 14 interposed therebetween.

The top wall 11b, two side walls 11c, and bottom wall 11e are inclined toward the rear side as a whole and, especially, the rear wall 11d is formed at an inclination calculated in advance considering a preset positional relationship between the screen 13 mounted on the front side and the reflection of images by a projection lens to be described later. The base 14 for mounting the mirror is formed inside the inclined rear wall 11d. The base 14 allows the inclination of the mirror 15 mounted thereon to be fine-adjusted.

It is not essential that the base 14 itself has a mechanism for fine-adjusting. For example, the base 14 carrying the mirror 15 may be mounted with an elastic member such as a spring, rubber, or sponge interposed at the mounting member such as a vise or bolt so that its mounting angle is adjusted by adjusting the clamping force.

The bottom wall 11e is formed with an opening 16 to which faces a projection lens to be described later substantially in the middle thereof, and the opening 16 is the only opening the upper cabinet 11 has. A flange portion 17 for coupling the upper cabinet 11 with the lower cabinet 12 is formed to project at a part of the bottom wall 11e.

All devices required for a liquid crystal rear projection television are provided in the lower cabinet 12 excluding the screen 13 and the mirror 15 which are provided in the upper cabinet 11 as described above. For example, three LCD's 18, a video device 19 including a driving circuit, and a projection lens 20 are disposed substantially in the center of the lower cabinet 12 as a main component portion. A light source 21 is detachably disposed to the left or right of the central portion (to the right when viewed from the front in this embodiment). Speaker portions 22 are disposed to the left and right.

The LCD's 18 is provided using, for example, three (RGB) compact and high definition polysilicon TFT liquid crystal panels (1.35 inches/512,880 dots) to achieve high image quality and constitute a so-called optical unit in conjunction with the projection lens 20. For example, the driving circuit is provided using a printed circuit board loaded with a plurality of electronic components as needed. As the light source 21, for example, a high performance high intensity discharge lamp (HID lamp of 100 W) is used. It is configured in the form of a cartridge as a whole so that it can be easily replaced from the front side.

Such a main component portion is contained in an internal space 24 defined by a partition 23 in the lower cabinet 12. The projection lens 20 is contained in a state in which it slightly projects from a through hole 23a provided in an upper part of the partition 23 so that a focusing operation can be performed from the outside of the partition 23.

In the internal space 24, a rear-side air path 27 and a front-side air path 28 are defined by a support plate 25 which is disposed diagonally and a partition plate 26 which is disposed on the rear side of the same and has a recess in the longitudinal direction (lateral direction when viewed from the front). The air paths 27 and 28 communicate with each other through a communication port of a predetermined size and a fan 30 substantially in the middle thereof to cool the LCD's 18, video devices 19, light source 21 and the like.

Specifically, the video devices 19 including the three LCD's 18 are mounted on and supported by the support plate 25 in the vicinity of the communication port 29 substantially in the middle thereof. The rear-side air path 27 is in communication with an air inlet 31 provided in a predetermined position on the front side (to the left when viewed from the front). By driving the fan 30, the outside air is taken in from the air inlet 31 through the rear-side air path 27. The outside air is blown into the communication port 29 to be sent out to the front-side air path 28. This puts the three LCD's 18 and the video devices 19 in contact with the outside air to be properly and continuously cooled.

After cooling the LCD's 18 and the video devices 19, the outside air sent out to the front-side air path 28 is further brought into contact with the exterior of the light source 21 provided downstream of them and is discharged to the outside after removing heat from the light source 21. Such discharge takes place at the rear side of the lower cabinet 12.

An appropriate filter is detachably provided on the air inlet 31 to eliminate smoke, dust and the like in the air. Since this filter allows the intake air to be cleaned, no dirt will stick to the internal air paths and various devices.

An operation panel portion 32 is mounted on the front side of the lower cabinet 12 in the vicinity of the center thereof to allow various operations to be manually performed and also to allow operations under remote control. The light source 21, speaker portion 22 and air inlet 31 are hidden by covering them entirely with a decorative grill 33 detachably disposed on the front side to provide preferable appearance as a whole.

Thus, it is possible to replace the light source 21 or the filter of the air inlet 31 with new one easily by removing the grill 33 on the front side without shifting or moving the installed liquid crystal rear projection television.

Further, various circuits 34 including hi-vision signal input circuit for performing a double-speed processing on video signals and a circuit for achieving high image quality in the horizontal direction are provided on the rear side of the partition 23 in the lower cabinet 12. A rear cover 35 is provided to protect such circuits and to allow coupling with the upper cabinet 11.

This rear cover 35 is rigidly mounted on the lower cabinet 12 at a plurality of locations thereof using, for example, a mounting member 36 such as a vise. It is also rigidly mounted on the upper cabinet 11 at an upper edge portion thereof using a plurality of mounting members 37. The rear cover 35 is formed with a plurality of grills 38 on the sides and rear thereof to allow the air to flow through the space it defines in conjunction with the partition 23. Further, an opening is provided in a part of the rear cover 35, and a terminal 39 is provided to face the opening so that it can be connected to an external device, such as an antenna.

As described above, in the liquid crystal rear projection television, the upper cabinet 11 including the screen 13 and the reflection mirror 15 and the lower cabinet 12 including the devices and circuits required for the television are separably formed to allow the screen size of the upper cabinet 11 to be arbitrarily selected with respect to the lower cabinet 12.

In other words, an upper cabinet 11 of any screen size, e.g., 37 inches, 50 inches or more, can be used with a common lower cabinet 12. This makes it possible to manufacture televisions having different sizes, different in so-called sizes in inches, easily by simply changing the upper cabinet 11.

Figure 7:
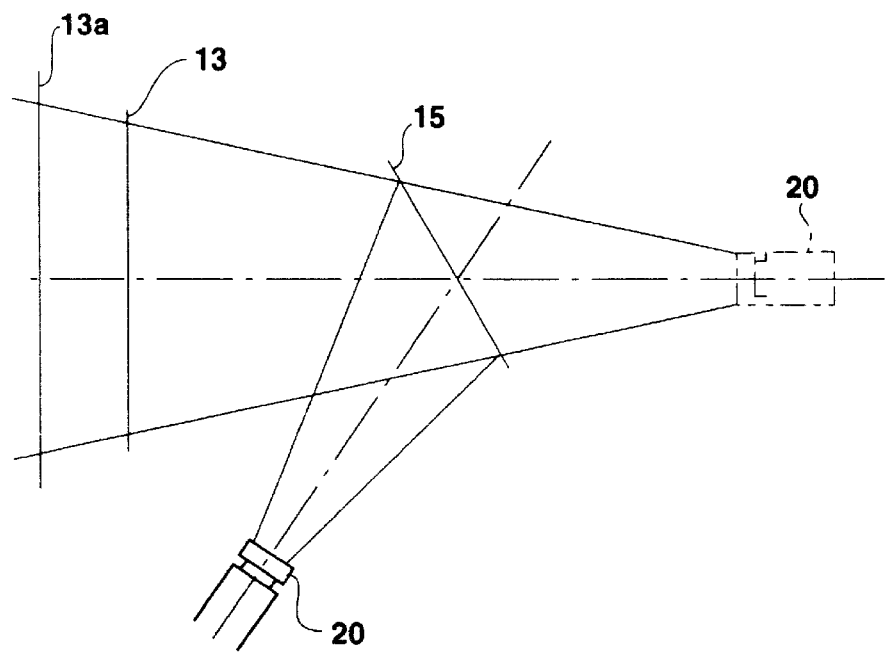
FIG. 7 illustrates the principles of the focusing of a projection lens in a rear projection television.

In this case, it is necessary only to adjust the optical system so as to meet the system of the used sizes in inches. Specifically, as shown in FIG. 7, a change in the size in inches of a television means an increase or decrease in the focusing position of image beam through the projection lens 20. For example, the focusing position from the projection lens 20 will be different for a screen 13 of 37 inches and a screen 13a of 50 inches. It is necessary only to adjust the projection lens 20 so as to obtain such focusing positions.

The focus of the projection lens 20 provided on the lower cabinet 12 can be externally adjusted by operating the projection lens 20 before the upper cabinet 11 is mounted and combined. It is therefore possible to accommodate any size in inches of the screen of the upper cabinet 11 easily by adjusting the focus to the screen 13 of 37 inches, the screen 13a of 50 inches, or the like.

Figure 8:
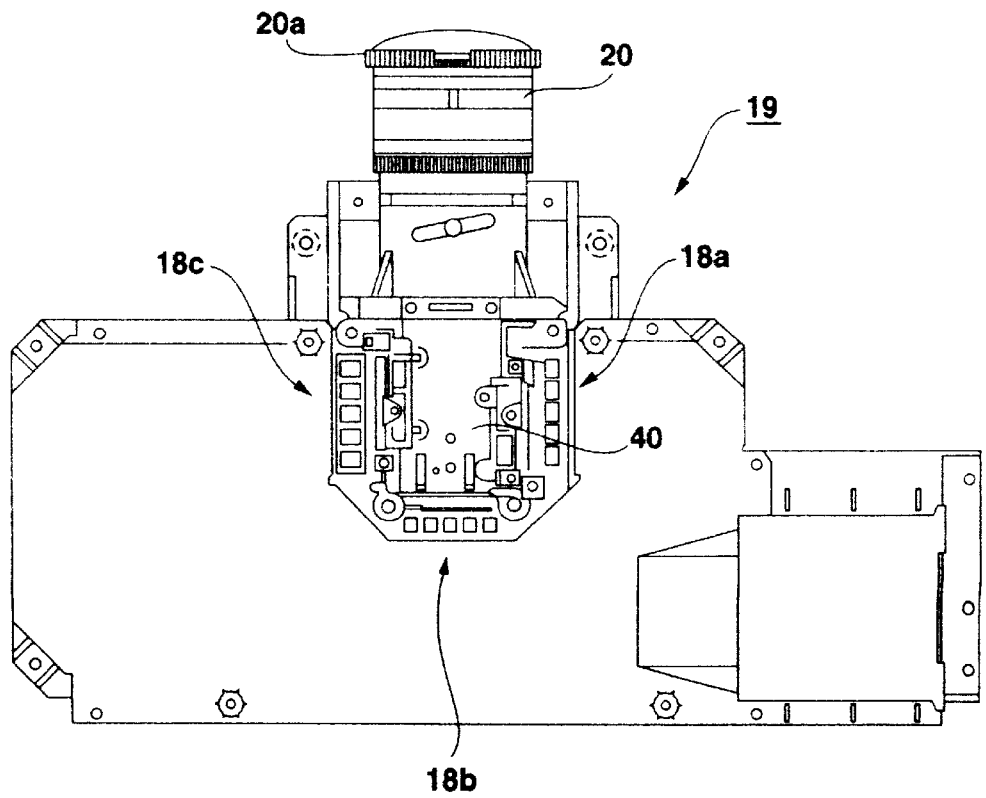
FIG. 8 schematically illustrates video devices used in the first embodiment.

The adjustment of the focus of the projection lens 20 in such a case will be described with reference to FIG. 8. The plurality of LCD's 18 are constituted by a red-light liquid crystal plate 18a, green-light liquid crystal plate 18b and a blue-light liquid crystal plate 18c which provide three primary colors of light. All colors on one screen are synthesized using these three liquid crystal plates. These liquid crystal plates or LCD's are disposed substantially in the form of U with a dichroic prism 40 disposed in the center thereof.

The dichroic prism 40 synthesizes colors of lights transmitted through the above-described liquid crystal plates 18a, 18b, and 18c for the respective colors and a condenser lens (not shown) into a color image on a single screen. The color image is projected from the side on which the liquid crystal plates 18a, 18b, and 18c for the respective colors are not disposed, and the projection lens 20 is disposed on the side at which the projection is performed. These components are formed into a unit which in conjunction with the projection lens 20 constitute the video device 19.

Focus adjustment is performed on the projection lens 20 to form the color image projected by the dichroic prism 40 in a predetermined position (distance). For example, a frame portion 20a of the projection lens 20 is gripped and turned clockwise to decrease the focusing distance and is turned in the opposite direction to increase the focusing distance.

As shown in FIG. 7, for example, the accuracy of focus adjustment is improved for better operability by setting the focus on the 37-inch screen 13 in advance with a stopper of the frame portion 20a activated to work first at that position and by activating another stopper to work at a position which is reached by a turn of the frame portion 20a given to adjust the focus on, for example, the 50-inch screen 13a. As the stoppers in this case, for example, mechanisms may be employed which engage and disengage at predetermined turns which are manifested in the form of clicks.

Meanwhile, a difference in the size in inches of televisions means a difference in the size of the upper cabinets 11. For example, if it is assumed that a reference size is 37 inches, the upper cabinet is formed with a larger size for 50 inches.

Figure 9:
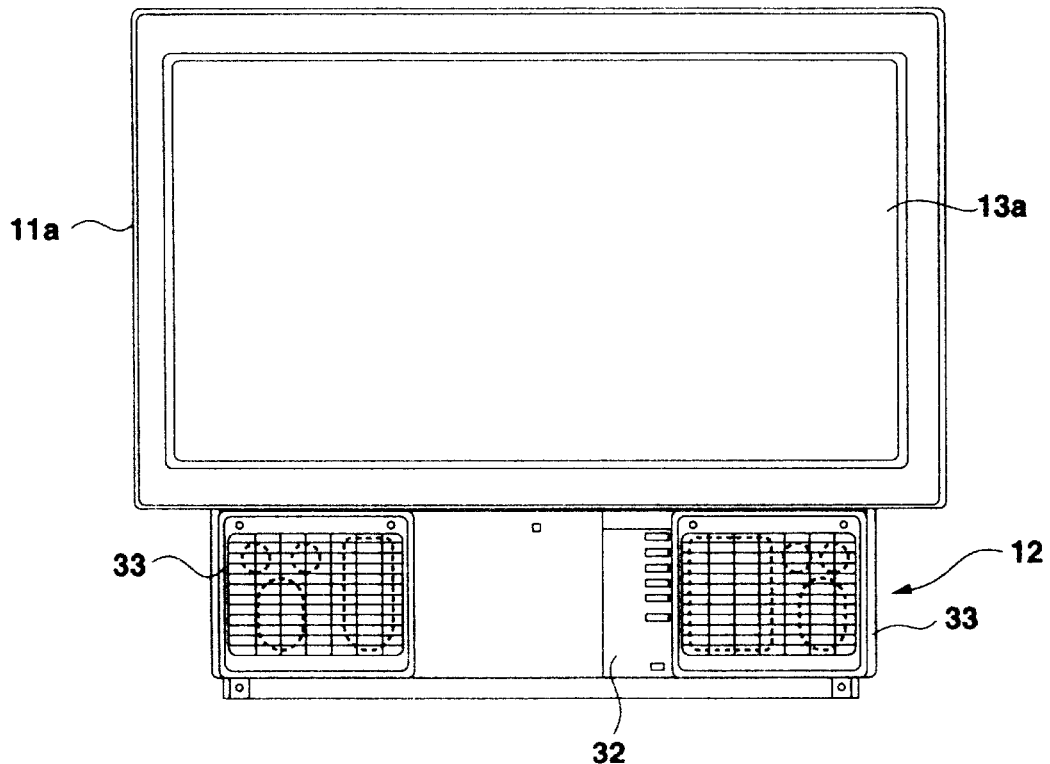
FIG. 9 is a front view of a rear projection television according to a second embodiment of the present invention.
Figure 10:
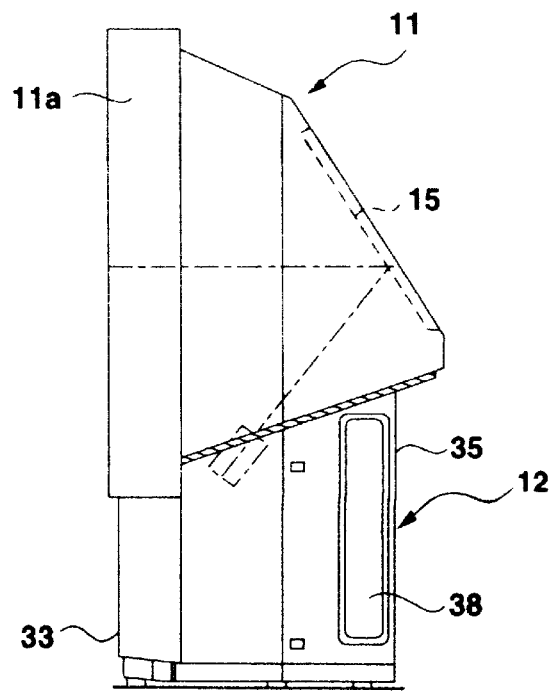
FIG. 10 is a side view of the rear projection television according to the second embodiment.

An example of such is shown in FIGS. 9 and 10 as a second embodiment of the invention.

In the second embodiment, the same lower cabinet 12 as that of the above-described first embodiment is used. Since the upper cabinet 11 is different only in that it has a different overall size and the components thereof remain unchanged, the components are given the same reference numbers and will not be described in detail.

Since the upper cabinet 11 is 50 inches in terms of television size, the screen 13a is formed more widely than the 37-inch screen 13, and the upper cabinet 11 is formed more largely accordingly. Therefore, it sticks out from the lower cabinet 12 as a whole. However, the overall weight is not increased so much because its interior is empty with only the reflection mirror 15 mounted therein similarly to the above-described first embodiment and the opening 16 is provided.

Then, the focus of the projection lens 20 is set on the basis of the size in inches of the upper cabinet 11 to be placed on the common lower cabinet 12 and, thereafter, the upper cabinet 11 is placed on and integrally assembled with the lower cabinet 12.

In doing so, the upper cabinet 11 may stick out in a state in which it is balanced in four horizontal directions. Alternatively, it may stick out in a state in which it is balanced in the left-and-right direction and biased toward the front or rear portion in the back-and-forth direction. In any case, it is sufficient that if the shape of the lower surface of the upper cabinet 11 is formed so that it preferably fits the upper surface of the lower cabinet 12 when they are assembled and combined taking the positional relationship of the opening 16, the flange portion 17 for coupling, and the like into consideration.

When assembled together, each of the upper cabinet 11 and the lower cabinet 12 is substantially partitioned. Especially, no dust enters the upper cabinet 11 from the outside because it is blocked from the outside. This substantially prevents the screen 13 or 13a and the mirror 15 from getting dirty due to dust and allows images to be clearly displayed even after use for a long period.

Further, the projection lens 20 is mounted on the lower cabinet 12 and its focus can be freely set using a rotating system, zoom system, or the like. For example, a configuration may be employed wherein the accurate distance to the screen is calculated or measured in advance; the focusing positions for 37 inches and 50 inches are precisely set; each of those positions is indicated by a scale; and a predetermined stopper mechanism is provided to allow positioning at each of those positions with the feel of a click.

Since the configuration allows the focus of the projection lens 20 to be positioned at preset positions, the focus can be quickly changed to adapt to each size in inches of the upper cabinet 11; it can be visually checked to determine whether any change has been made or not; and the lower cabinet 12 and the upper cabinet 11 can be properly assembled, i.e., televisions of different sizes in inches can be manufactured accurately and efficiently.

In addition, when a user wishes to change a 37-inch television in actual use to a 50-inch television, the user can change the size of the television in an easy and inexpensive way only by purchasing an upper cabinet 11 and assembling it after changing the set position of the projection 20 from that for 37 inches to that for 50 inches.

As described above, a liquid crystal rear projection television according to the present invention has a configuration wherein an upper cabinet and a lower cabinet are separably formed; at least a screen and a mirror are provided on the upper cabinet; a main component portion comprising at least video devices, driving and control circuits, an optical unit including a projection lens, and a light source is provided on the lower cabinet; and the size of the upper cabinet set in an upper part can be selected by adjusting the focus of the projection lens. Thus, the lower cabinet can be commonly used for televisions of difference screen sizes. This provides a significant advantage in that televisions of various screen sizes can be easily provided only by changing the upper cabinet to those having appropriate screen sizes, which results in improved productivity and significant cost reduction.

Further, since the upper cabinet is formed like a box which is enclosed at all sides thereof with an opening provided on the bottom thereof to which faces the projection lens, when it is assembled with the lower cabinet, it is sealed from the outside as a whole and allows no dust from entering from the outside. This results in a significant advantage in that the screen and mirror will not get dirty and clean screen display can be maintained during use for long period.

Further, the lower cabinet is provided with an air inlet at the front side thereof to cool the interior thereof by the outside air taken in from the air inlet, an air flow path to discharge the air at the rear side thereof, and a filter detachably disposed on the air inlet. This provides a significant advantage in that the main component portion is protected from thermal destruction and in that the filter can be easily replaced without shifting or moving the position in which the television is installed.

Furthermore, a configuration is employed wherein a light source mounting portion is provided on the front side of the lower cabinet, and a light source is detachably mounted on the light source mounting portion. This provides a significant advantage in that the replacement of the light source can be also easily carried out without shifting or moving the position in which the television is installed.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A rear projection television comprising:

an upper cabinet having a screen and a mirror therein and being void of air outlets; and a lower cabinet accommodating video devices, driving and control circuits, and an optical unit having a projection lens therein, said lower cabinet including:
a fan,
a front air inlet,
a rear air outlet,
an enclosure having a support plate for dividing said enclosure into a rear sub-enclosure communicating with said rear air outlet and a front sub-enclosure communicating with said front air inlet,
said support plate having a port for supporting said fan therein, and said support plate adapted to support said video devices in said front sub-enclosure,
said front sub-enclosure having an opening formed so that said projection lens extends therethrough forming a snug fit therewith,
said fan circulating air from said front air inlet to said rear air outlet cooling said video devices supported in said front sub-enclosure,
wherein said upper cabinet and said lower cabinet are separably formed, a focus of said projection lens is adapted to be variably adjusted to focus on a selected size of a predetermined number of standard screen sizes of said upper cabinet, and said upper cabinet is detachably attached to said lower cabinet, and
said upper cabinet has a bottom wall having a lens opening formed to receive a portion of said projection lens and a flange portion so that said upper cabinet forms an airtight seal with said lower cabinet when said upper cabinet is attached to said lower cabinet, thereby preventing dust from entering said upper cabinet.

2. The rear projection television according to claim 1, wherein a filter is detachably disposed on said front air inlet.

3. The rear projection television according to claim 1, wherein said lower cabinet has a light source mounting portion at a front side thereof and said light source is detachably mounted on said light source mounting portion.

4. The rear projection television according to claim 1, wherein said upper cabinet further comprises a top wall, a side wall, and a rear wall.

5. The rear projection television according to claim 4, wherein said rear wall is formed at an inclination determined by a relation between said screen mounted on a front side of said upper cabinet and a reflection of an image projected from said projection lens.

6. The rear projection television according to claim 4, wherein said mirror is mounted on an inside surface of said rear wall and an inclination of said mirror is adjustable.

7. The rear projection television according to claim 1, wherein a speaker is disposed at a front side of said lower cabinet.

8. The rear projection television according to claim 1, further comprising a speaker, a light source, and a grill, wherein said speaker, said front air inlet and said light source are disposed at a front side of said lower cabinet and covered by said grill.

* * * * *